United States Patent [19]

Suzuki

[11] 4,413,380
[45] Nov. 8, 1983

[54] BINDING LOCKER

[75] Inventor: Tadashi Suzuki, Saitama, Japan

[73] Assignee: Satogosei Co., Ltd., Tokyo, Japan

[21] Appl. No.: 179,810

[22] Filed: Aug. 20, 1980

[30] Foreign Application Priority Data

Jan. 8, 1980 [JP] Japan .................................. 55-679

[51] Int. Cl.³ ............................................ B65D 63/00
[52] U.S. Cl. ............................. 24/16 PB; 24/17 AP;
24/30.5 P; 248/74 PB
[58] Field of Search ........... 24/16 PB, 17 AP, 206 A,
24/150 FP, 30.5 P; 292/318, 321, 322; 248/74
PB

[56] References Cited

U.S. PATENT DOCUMENTS

| 2,979,794 | 4/1961 | Bartolo | 24/16 PB |
|---|---|---|---|
| 3,581,347 | 6/1971 | Verspieren | 248/74 PB |
| 3,837,047 | 9/1974 | Bunnell | 24/16 PB |
| 3,855,669 | 12/1974 | Meyer | 24/16 PB |
| 3,887,965 | 6/1975 | Schuplin | 24/16 PB |
| 3,967,345 | 7/1976 | Sumimoto | 24/16 PB |
| 3,996,646 | 12/1976 | Caveney | 24/16 PB |
| 4,009,509 | 3/1977 | McCormick | 24/16 PB |
| 4,138,770 | 2/1979 | Barrette et al. | 24/16 PB |

FOREIGN PATENT DOCUMENTS 2717622 10/1978 Fed. Rep. of Germany ... 24/16 PB

| 47-24205 | 8/1972 | Japan . |
|---|---|---|
| 49-115389 | 10/1974 | Japan . |
| 51-6375 | 2/1976 | Japan . |
| 51-12831 | 4/1976 | Japan . |
| 53-5281 | 1/1978 | Japan . |
| 54-42869 | 12/1979 | Japan . |

Primary Examiner—Victor N. Sakran
Attorney, Agent, or Firm—Nathaniel A. Humphries

[57] ABSTRACT

A binding locker is disclosed including a band having a rack of teeth thereon and a socket having a hole for receiving a leading end of the band. A locking member having a plurality of locking teeth thereon is disposed within the socket's hole so that the locking teeth mesh with the engaging teeth of the rack to thereby tie the socket and band together thus binding a plurality of objects such as wires together. The socket hole has a curved surface disposed to face or oppose the locking member and for receiving a mating, oppositely curved surface of the band. Further, the locking member is connected to the socket to be rotatable within the hole and further, has a projection extending oppositely of its locking teeth. An opening is disposed within the socket at substantially right angles with the axis of the socket hole to receive the projection of the locking member. Further, the band has a pair of ribs extending lengthwise therealong between which the rack of teeth extend.

1 Claim, 9 Drawing Figures

BINDING LOCKER

DESCRIPTION

Background of Prior Art

This invention relates to binding lockers, each adapted to be disposed around a bundle of objects such as electric wires and to have its ends secured together, thus binding the bundle of objects together.

Various bands to be used to bind objects such as electric wires or other wires and lines are already known. Such structures are known as including a band to be wound about wires or lines, and a locking socket through which the band is inserted to engage a plurality of locking teeth integrally formed with the band; such structures are disclosed, for example, in the publications of Japanese Utility Model Publication Nos. 42869/1979, 6375/1976 and 2405/1972, Laid Open Nos. 5281/1978 and 115389/1974 and Japanese Patent Publication No. 12831/1976. Problems have arisen with these disclosed bands; they have defects because the band, when it is inserted through the hole of its locking socket, is inclined with respect to the axis of the socket hole and, as a result, may not be smoothly inserted through the socket hole. A force in a direction other than the direction of the axis of the socket hole acts to strain the connecting part of the locking teeth. The material of the band and locking teeth is deformed when such strain force is exerted for a prolonged period as the temperature and humidity change. For example, such a band may be made of a polyamide resin, which tends to inflate considerably with the rise of the hygroscopicity or temperature. As a result, the locking between the teeth becomes imperfect and the binding loosens.

According to the results of binding strength tests as made on the locker and socket of a conventional binding, the application of a large force deforms the socket and its ability to be securely locked with its socket is lost.

Brief Summary of the Invention

It is an object of the present invention to provide a binding locker wherein there is no such defect as in the conventional binding locker, and the binding is made smoothly and positively for a prolonged period of time.

In accordance with this and other objects, a binding locker in accordance with the teachings of the present invention includes a band having a rack of teeth thereon and a socket having a hole for receiving a leading end of the band. A locking member having a plurality of locking teeth thereon is disposed within the socket's hole so that the locking teeth mesh with the engaging teeth of the rack to thereby tie the socket and band together thus binding a plurality of objects such as wires together. The socket hole has a curved surface disposed to face or oppose the locking member and for receiving a mating, oppositely curved surface of the band. Further, the locking member is connected to the socket to be rotatable within the socket's hole and further has a projection extending oppositely of its locking teeth. A further opening is disposed within the socket at substantially right angles with the axis of the socket hole, to receive the projection of the locking member. Further, the band has a pair of ribs extending lengthwise therealong between which the rack of teeth extend.

In order to bind a leading portion of the band to the socket, the leading portion of the band is inserted within the hole of the socket whereby the engaging teeth of the rack engage with the locking teeth of the locking member. If a force is exerted upon the band tending to withdraw it from the hole of the socket, the engaging teeth engage the locking member tending to move the locking member into a more engaging relationship with the band, which is tightly confined by the arcuate surface of the socket hole thus ensuring that the engaging teeth of the rack and the locking teeth of the locking members are held in sure engagement and that the socket and band will be tied together securely even for prolonged periods of time.

Detailed Description of Invention

The present invention shall be described more particularly in following with reference to the drawings.

Figure 1A:
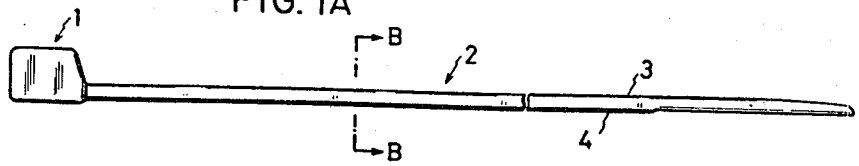
FIGS. 1A, B, and C, respectively, show a side view, a plan view and a bottom view of a binding locker in accordance with a preferred embodiment of this invention.
Figure 1B:
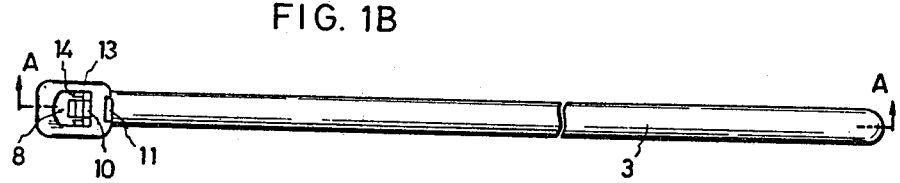
Figure 1C:
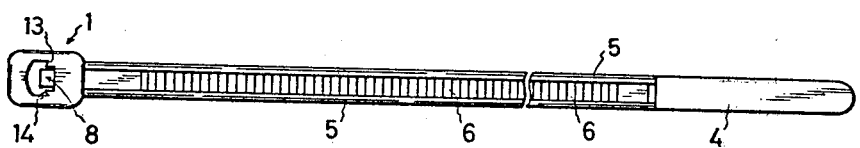
Figure 2:
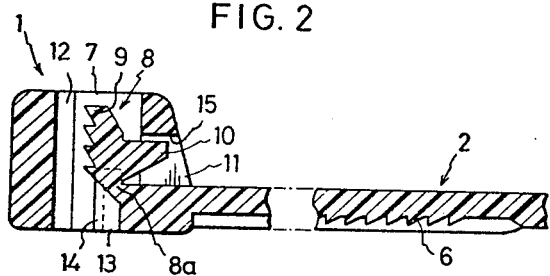
FIG. 2 is a magnified, sectioned view of the binding locker as taken along line A—A of FIG. 1B.
Figure 3:
FIG. 3 is a sectioned view of the binding locker as taken along line B—B of FIG. 1A.
Figure 4:
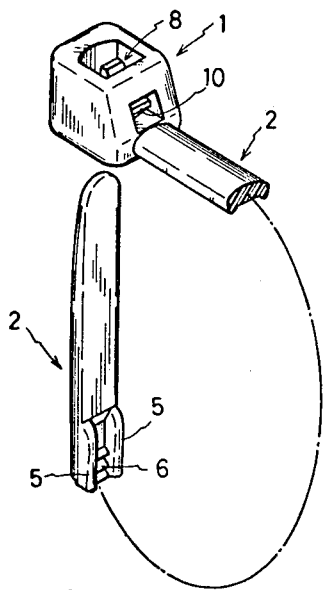
FIG. 4 is a perspective view showing the band before it is inserted through the socket of the binding locker of FIGS. 1A, B and C.

In a preferred binding locker of the present invention, as shown in FIGS. 1A to 1C, a socket 1 and band 2 are integrally formed. The band 2 is formed with an upper surface 3 having a concave surface 3, as shown in FIG. 3. As shown in FIG. 1C, the band 2 has ribs 5 thereof formed on the edges of the bottom surface 4 and extending lengthwise therealong. The bottom surface 4 has a rack 6 of serrated engaging teeth extending between the above-mentioned ribs 5. The band 2 is made gradually thinner as shown in FIG. 1A, and its leading end is rounded at its tip as shown in FIG. 1C. The other end of the band 2 is connected to the socket 1, which has hole 7 therethrough. A locking member 8 is formed integrally with a surface of and projects into the hole 7. As shown in FIG. 2, the locking member 8 is attached by a connecting part 8a to the surface of the hole 7 and has a plurality of locking teeth 9 and a projection 10 formed oppositely of the locking teeth 9 and disposed within an opening 11 made at right angles with an axis 7a of the hole 7. The opening 11 has a wall surface 15 that is disposed on the outlet side direction of the hole 7 for engaging a projection 10 of the locking member 8, as will be explained. A sure fit and engagement between the locking teeth 9 and the engaging teeth of the rack 6 is established by making the slope or pitch of the first tooth 9a as seen from the inserted part of the band less than of the remaining teeth 9b to d; i.e. the angle of the engaging surface of the tooth 9a with respect to the axis 7a is greater than the corresponding angles of the teeth 9b to d.

The hole has an inner wall 12, which faces the locking member 8 and is formed to present an arcuate concave or convex curved surface to receive the arcuate upper surface 3 of the band 2, the surface 3 having an opposite curve to that of the wall 12. A pair of projections 13 for receiving the leading end of the band 2 are formed within the hole 7 on either side of the locking member 8, and each projection 13 presents a guiding face 14 disposed parallel to the axis 7a and forming a space for passing the ribs 5 of the band 2.

The socket 1 having the locking member 8 connected thereto and the band 2 are integrally formed of a suitable plastic; which may illustratively be made of a polyamide, polypropylene or any other thermoplastic resin exhibiting a high degree of hardness and flexibility.

The socket 1 of the binding locker of the present invention can be made very small. The socket including the locking member is easy to mold and to separate from the mold.

To use the binding locker of the present invention, the band 2 is wound about objects such as wires, and the leading end of the band 2 is inserted through the through hole 7 of the socket 1 whereby the ribs 5 of the band 2 are led by the projections 13 to be smoothly inserted along the axis 7a through the hole 7, so that the locking teeth 9 will mesh and engage with the rack 6 of the engaging teeth.

Figure 5A:
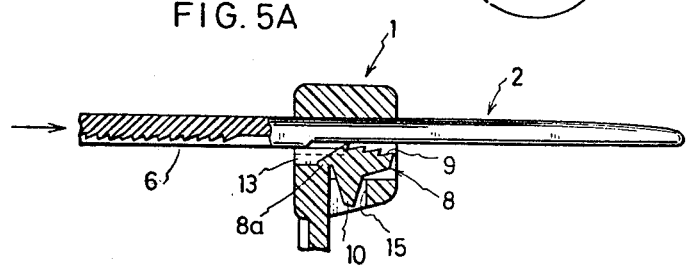
FIGS. 5A, B and C are sectioned views of the binding locker of this invention showing the band as inserted within the socket, showing the band locked within the socket and showing the band as tensioned to prevent its release from the socket, respectively.

When the band 2 is inserted, it will be led by the projections 13 of the side wall of the socket 1 to advance along the axis 7a of the hole 7 in a manner to engage the curved wall 12; therefore, any force that may be exerted on the band 2 in a direction askewed from the axis 7a will have little effect on the locking member. A withdrawing force exerted on the band 2 will tend to rotate the locking member 8, as shown in FIG. 5a, to tighten the engagement between the locking and engaging teeth.

Figure 5B:
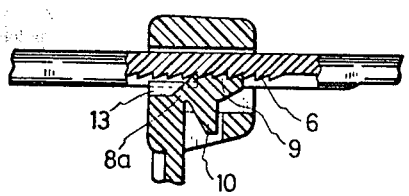
Figure 5C:
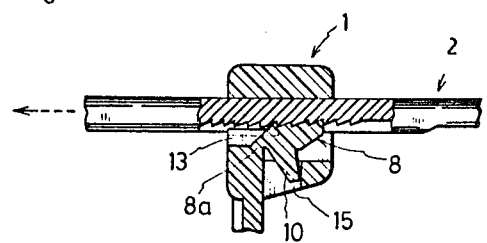

When the band 2 has been locked with the socket 1 as shown in FIG. 5B, a force exerted on the band 2 to disengage it from the socket 1, as shown in FIG. 5C, will be relieved by the projection 10, which upon being rotated will engage the wall surface 15. As shown in FIG. 5C, a withdrawing force exerted on the band 2 rotates the locking member 8 clockwise forcing the teeth 9 into surer contact with the rack 6 of teeth. Any non-axial force exerted on the band 2 will have little effect on the connecting part 8a of the locking member 8 and therefore the engagement of the band 2 and the socket 1 is kept positive. As the projection 10 of the locking member 8 contacts the opposed wall surface 15 of the hole 11, the band 2 will be positively prevented from being pulled out of the socket 1.

Further, even if the side wall of the socket is deformed, the ribs 5 are provided with tapered end surfaces and the band 2 is provided with its curved surface 3 to mate with the arcuate inner wall 12 and the projections 13 to keep the rack 6 of the engaging teeth and the locking teeth 9 in a fixed bound relation. Therefore, even as such environmental conditions as the temperature and humidity change, the band 2 and the socket 1 will remain bound securely together for prolonged periods.

Further, the fastening force applied in binding the band 2 to the socket 1 will tend to flatten the upper curved surface 3 of the band 2 and thus, the tendency of the flattened surface to return to its original, curved shape will tend to hold more securely the bound objects.

What is claimed is:

1. A binding locker for binding a plurality of objects together, said binding locker comprising:
   (a) a band having a rack of engaging teeth formed on one surface thereof, said band having a leading end and a connecting end;
   (b) a socket connected to said connecting end of said band and having a hole having an axis extending therethrough for receiving said leading end of said band, said socket further including an opening in communication with said hole and disposed at substantially right angles with said axis, said hole having a locking member projecting therein, said locking member having a plurality of locking teeth for meshing with said engaging teeth when said band is inserted within said hole, whereby said leading end of said band and said socket are securely tied together to bind the plurality of objects;
   (c) wherein said locking member has a projection disposed oppositely of said locking teeth and within said opening; and
   (d) wherein said opening has an engaging surface and said locking member is secured to said socket in a manner to be movable as a force is exerted upon said band tending to withdraw it from said socket, whereby said projection is brought into contact with and is stopped by said engaging surface.

* * * * *